(12) United States Patent
Ryu et al.

(10) Patent No.: US 12,540,888 B2
(45) Date of Patent: Feb. 3, 2026

(54) APPARATUS AND METHOD FOR MEASURING PROPERTIES OF POLYMER

(71) Applicant: SAMSUNG ELECTRONICS CO., LTD., Suwon-si (KR)

(72) Inventors: Hansung Ryu, Suwon-si (KR); Haksung Kim, Seoul (KR); Gyunghwan Oh, Suwon-si (KR); Heonsu Kim, Seoul (KR); Dongwoon Park, Seoul (KR); Jeonghyeon Baek, Seoul (KR)

(73) Assignees: Samsung Electronics Co., Ltd., Suwon-si (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 392 days.

(21) Appl. No.: 18/180,533

(22) Filed: Mar. 8, 2023

(65) Prior Publication Data
US 2023/0375452 A1 Nov. 23, 2023

(30) Foreign Application Priority Data
May 20, 2022 (KR) .................. 10-2022-0061875
Aug. 17, 2022 (KR) .................. 10-2022-0102669

(51) Int. Cl.
*G01N 11/00* (2006.01)

(52) U.S. Cl.
CPC ...... *G01N 11/00* (2013.01); *G01N 2011/0013* (2013.01); *G01N 2011/0066* (2013.01);
(Continued)

(58) Field of Classification Search
None
See application file for complete search history.

(56) References Cited

U.S. PATENT DOCUMENTS 6,603,901 B1   8/2003   Hale et al.
9,267,854 B2   2/2016   Asokan et al.
(Continued)

FOREIGN PATENT DOCUMENTS

CN   1828261 A   * 9/2006
CN   101105452 A * 1/2008
(Continued)

OTHER PUBLICATIONS

Baek, Jeong-Hyeon, et al., "Effect of cure shrinkage of epoxy molding compound on warpage behavior of semiconductor package", Materials Science in Semiconductor Processing, vol. 148, 106758, Sep. 2022, 13 pp.
(Continued)

*Primary Examiner* — Daniel S Larkin
(74) *Attorney, Agent, or Firm* — Wolf, Greenfield & Sacks, P.C.

(57) ABSTRACT

An apparatus for measuring properties of a thermosetting polymer includes a body having a first chamber and a second chamber each filled with the thermosetting polymer material. A first FBG sensor is disposed in the polymer material within the first chamber and a second FBG sensor is disposed in the polymer material within the second chamber. A first dielectric constant sensor is in the first chamber, and a second dielectric constant sensor is in the second chamber. A computing device is configured to measure properties of the thermosetting polymer based on wavelength data measured using the first FBG sensor and the second FBG sensor, and a loss coefficient of the polymer material measured using the first dielectric constant sensor and the second dielectric constant sensor, while the thermosetting polymer solidifies in the first chamber and the second chamber.

20 Claims, 16 Drawing Sheets

(52) U.S. Cl.
CPC ............... *G01N 2011/008* (2013.01); *G01N 2011/0093* (2013.01)

(56) References Cited

U.S. PATENT DOCUMENTS

| | | |
|---|---|---|
| 2011/0096321 A1 | 4/2011 | Roberts |
| 2020/0061874 A1 | 2/2020 | Hudson et al. |
| 2021/0033480 A1 | 2/2021 | Ren et al. |
| 2021/0223209 A1 | 7/2021 | Jung et al. |

FOREIGN PATENT DOCUMENTS

| | | | | |
|---|---|---|---|---|
| CN | 100529735 C | * | 8/2009 | |
| CN | 102445435 A | * | 5/2012 | |
| CN | 107367523 A | * | 11/2017 | ........... G01B 11/165 |
| DE | 102014105796 A | * | 6/2016 | ............... C08F 2/48 |
| KR | 101611792 B1 | | 4/2016 | |
| KR | 102040458 B1 | | 11/2019 | |

OTHER PUBLICATIONS

Lee, Jin-Hyuk, et al., "Cure Monitoring of Epoxy Resin by Using Fiber Bragg Grating Sensor", Journal of the Korean Society for Nondestructive Testing, vol. 36, No. 3, Jun. 30, 2016, pp. 211-216.

Wang, Y., et al., "Simultaneous Measurement of Effective Chemical Shrinkage and Modulus Evolutions During Polymerization", Experimental Mechanics, vol. 51, Oct. 1, 2010, pp. 1155-1169.

\* cited by examiner

APPARATUS AND METHOD FOR MEASURING PROPERTIES OF POLYMER

CROSS-REFERENCE TO RELATED APPLICATION(S)

This application claims benefit of priority to Korean Patent Application No. 10-2022-0061875 filed on May 20, 2022 and Korean Patent Application No. 10-2022-0102669 filed on Aug. 17, 2022 in the Korean Intellectual Property Office, the disclosures of which are incorporated herein by reference in their entirety.

BACKGROUND

Example embodiments of the present disclosure relate to an apparatus and a method for measuring properties of a polymer.

Thermosetting polymers may be used in various fields including semiconductor packaging. Unfortunately, some properties of thermosetting polymers may change as the thermosetting polymers solidify. When such changes are not accurately predicted, defects, such as warpage and breakage may occur. Accordingly, a method for accurately measuring properties of thermosetting polymers during solidification may be needed.

SUMMARY

An example embodiment of the present disclosure is to provide an apparatus and a method for measuring properties of a polymer which may accurately measure properties, such as an elastic modulus, the amount of chemical shrinkage, and a degree of hardening which may change during hardening of polymer materials using a fiber Bragg grating (FBG) sensor and a dielectric constant sensor.

According to an example embodiment of the present disclosure, an apparatus for measuring properties of a thermosetting polymer includes a body having a first chamber and a second chamber each configured to receive the thermosetting polymer material. A first fiber Bragg grating (FBG) sensor is within the first chamber, a second FBG sensor is within the second chamber, a first dielectric constant sensor is within the first chamber, and a second dielectric constant sensor is within the second chamber. At least one processor is in communication with the first FBG sensor, the second FBG sensor, the first dielectric constant sensor, and the second dielectric constant sensor, and is configured to measure properties of the thermosetting polymer within the first and second chambers, as the thermosetting polymer solidifies, using data received from the first FBG sensor and the second FBG sensor, the first dielectric constant sensor, and the second dielectric constant sensor.

According to an example embodiment of the present disclosure, an apparatus for measuring properties of a thermosetting polymer includes a body having a chamber configured to receive the thermosetting polymer. A sensor unit is within the chamber and includes an FBG sensor, a temperature sensor, and a dielectric constant sensor. At least one processor is in communication with the FBG sensor, the temperature sensor, and the dielectric constant sensor and is configured to generate wavelength data representing changes in a wavelength of light, caused by solidification of the thermosetting polymer, using raw wavelength data from the FBG sensor and calibration data from the temperature sensor. The at least one processor is also configured to measure properties of the thermosetting polymer using the generated wavelength data during a time period after an estimated gel point of the thermosetting polymer.

According to an example embodiment of the present disclosure, a method for measuring properties of a thermosetting polymer includes applying heat to the thermosetting polymer to cause the thermosetting polymer to solidify; obtaining raw wavelength data from an FBG sensor in contact with the thermosetting polymer; obtaining calibration data from a temperature sensor in contact with the thermosetting polymer; processing the raw wavelength data and the calibration data via the at least one processor to obtain effective wavelength data; measuring a loss coefficient of the thermosetting polymer using a dielectric constant sensor in contact with the thermosetting polymer; and processing the effective wavelength data and the loss coefficient to determine properties of the thermosetting polymer via the at least one processor.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Hereinafter, embodiments of the present disclosure will be described as follows with reference to the accompanying drawings.

Figure 1:
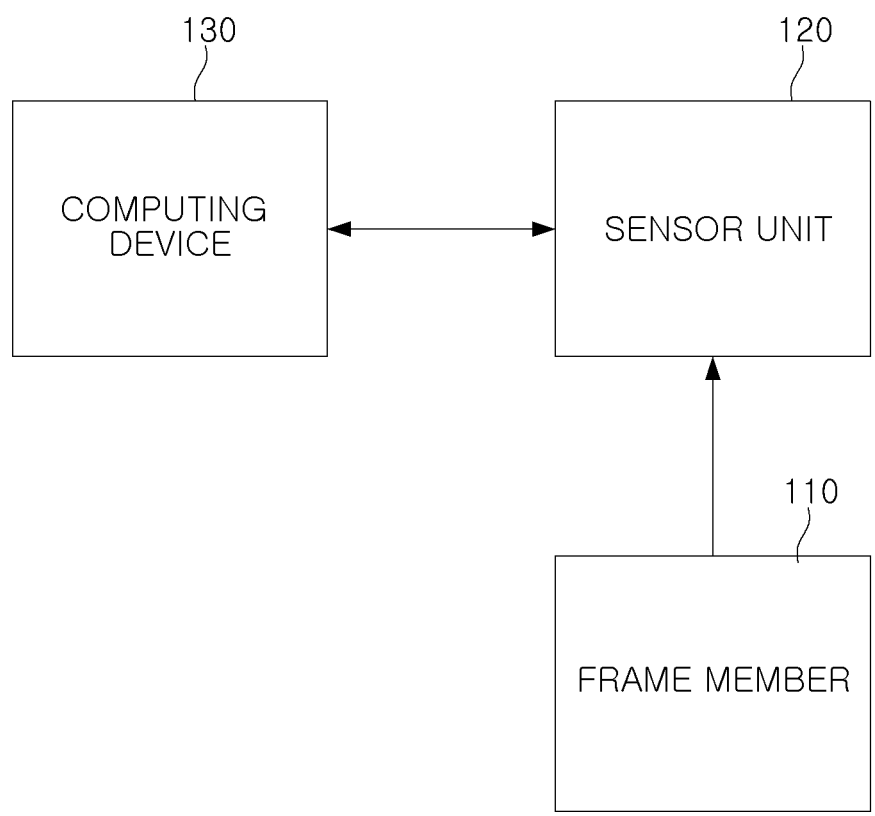
FIGS. 1 and 2 are diagrams illustrating an apparatus for measuring properties of a thermosetting polymer according to an example embodiment of the present disclosure.
Figure 2:
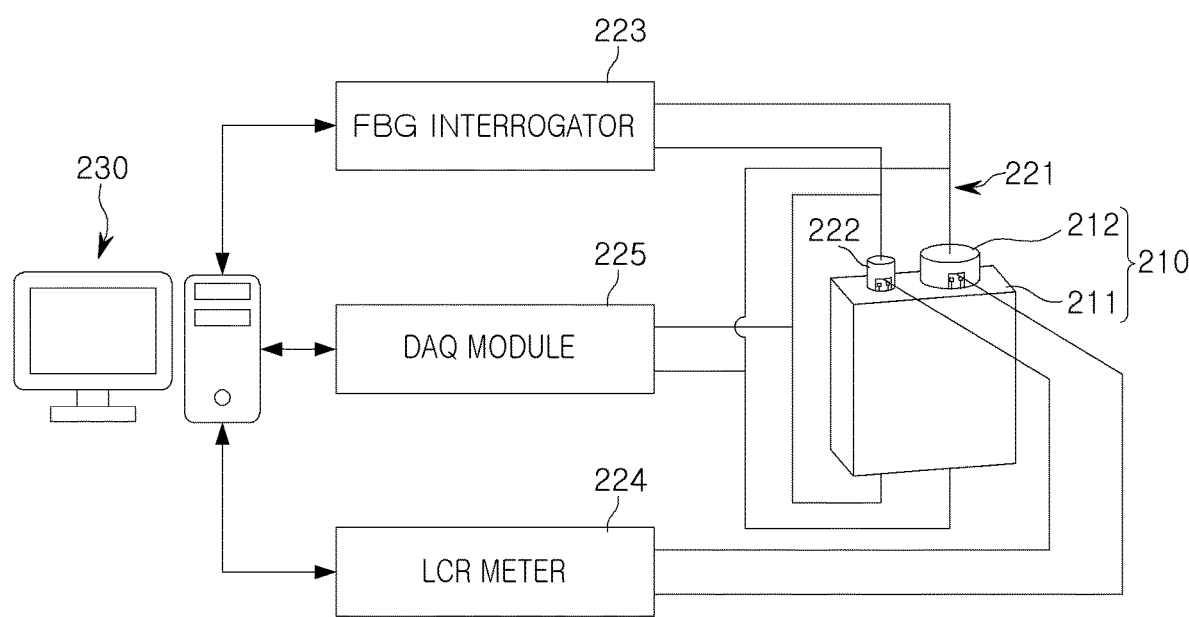

FIGS. 1 and 2 are diagrams illustrating an apparatus for measuring properties of a thermosetting polymer according to an example embodiment.

Referring to FIG. 1, an apparatus 100 for measuring properties of a thermosetting polymer according to an example embodiment may include a frame member body 110, a sensor unit 120, and a computing device 130. The body 110 may include at least one chamber configured to receive a thermosetting polymer therewithin, and for which various properties are to be measured as the thermosetting polymer is heated to solidification. The thermosetting polymer in the chamber of the body 110 may be solidified by heat applied to the body 110. For example, the thermosetting polymer may be an epoxy molding compound.

The sensor unit 120 may include a plurality of sensors in contact with the thermosetting polymer in the chamber of the body 110. In example embodiments, the sensor unit 120 may further include sensor devices for relaying signals between the plurality of sensors and the computing device 130 in addition to the plurality of sensors in direct contact with the thermosetting polymer.

The sensor unit 120 may include a fiber Bragg grating (FBG) sensor in which a Bragg grating is formed, and a dielectric constant sensor including a plurality of electrodes. In example embodiments, the sensor unit 120 may further include a temperature sensor for measuring a temperature while the thermosetting polymer solidifies.

The computing device 130 comprises at least one processor configured to measure properties of the thermosetting polymer, such as, for example, an elastic modulus, a chemical shrinkage amount, and a degree of solidification based on the data output by the sensor unit 120. For example, the computing device 130 may determine the amount of chemical shrinkage and an elastic modulus of the thermosetting polymer while the thermosetting polymer solidifies based on the wavelength data output by the FBG sensor. Also, the computing device 130 may determine a gel point of the thermosetting polymer based on a dissipation factor which may be data output by the dielectric constant sensor. The gel point may be a point in time during solidification of a liquid thermosetting polymer where fluidity decreases and viscosity increases such that the thermosetting polymer may change to a gel state, and the thermosetting polymer may have elasticity from the gel point.

The computing device 130 may measure changes in properties of the thermosetting polymer based on the gel point determined based on a loss coefficient. As described above, the gel point may be a point at which the thermosetting polymer solidifies, viscosity increases and elasticity may be obtained. Accordingly, changes in properties appearing in the thermosetting polymer after the gel point may have a great effect on a product to which the thermosetting polymer is applied.

For example, when the thermosetting polymer is applied as an encapsulant to a semiconductor package, or the like, changes in properties appearing in the thermosetting polymer after the gel point may have a significant effect on a warpage defect of the semiconductor package. Accordingly, measuring changes in properties of the thermosetting polymer after the gel point may be important in determining whether a product to which the thermosetting polymer is applied is defective.

In an example embodiment, by determining the gel point of the thermosetting polymer based on data obtained by a dielectric constant sensor, changes in properties of the thermosetting polymer after the gel point may be accurately measured. Accordingly, in addition to simply measuring properties of the thermosetting polymer material, the effect of the polymer material on a product such as a semiconductor package to which the thermosetting polymer is applied during the solidification process may be accurately determined.

Referring to FIG. 2, an apparatus 200 for measuring properties of a polymer according to an example embodiment may include a frame member 210, a sensor unit including a plurality of sensors 221 and 222, and a computing device 230. The frame member 210 may include a frame body 211 having a cavity or chamber filled with the thermosetting polymer, and a cap 212 coupled to the frame body 211 and configured to close the chamber containing the thermosetting polymer.

The plurality of sensors 221 and 222 may include an FBG sensor 221 and a dielectric constant sensor 222 in contact with the thermosetting polymer in the chamber of the frame body 211. The FBG sensor 221 may include an optical fiber on which a Bragg grating is formed, and for example, a temperature sensor for measuring the temperature of a thermosetting polymer may be configured to be combined with the optical fiber. The dielectric constant sensor 222 may include a plurality of electrodes to measure a loss coefficient from a resistance of a thermosetting polymer and a capacitor.

The sensor unit may further include a plurality of modules 223-225 for mediating signals between the plurality of sensors 221 and 222 and the computing device 230. For example, an output of the FBG sensor 221 may be input to the computing device 230 through an FBG interrogator 223. The FBG interrogator 223 may measure a wavelength of light output from the optical fiber of the FBG sensor 221, may convert the wavelength of light into wavelength data, and may transmit the wavelength data to the computing device 230. In example embodiments, the FBG interrogator 223 may be connected to a TCP/IP port of the computing device 230.

The dielectric constant sensor 222 may be connected to the computing device 230 through the LCR meter 224. The LCR meter 224 may measure resistance and capacitance while the thermosetting polymer is solidified based on the output of the dielectric constant sensor 222, and the computing device 230 may measure a loss coefficient of the thermosetting polymer based on the output of the LCR meter 224.

As described above, the optical fiber of the FBG sensor 221 may be provided in combination with a temperature sensor for measuring temperature. For example, the temperature sensor may be implemented as a thermocouple, and may be connected to the computing device 230 through the data acquisition (DAQ) module 225. The DAQ module 225 may detect electromotive force generated by the Seebeck effect in the thermocouple by changes in temperature of the thermosetting polymer, and the computing device 230 may sense changes in temperature of the thermosetting polymer based on the output of the DAQ module 225.

The computing device 230 may measure properties of the thermosetting polymer based on data received from each of the modules 223-225. For example, the computing device 230 may measure the amount of chemical shrinkage and/or an elastic modulus of the thermosetting polymer based on the wavelength data received from the FBG interrogator 223, and the gel point of the thermosetting polymer may be determined by calculating a loss coefficient based on the data received through the LCR meter 224.

Also, the computing device 230 may obtain calibration data representing a wavelength change occurring in the FBG sensor 221 due to a temperature change of the thermosetting polymer from the temperature information received from the DAQ module 225. In this case, the computing device 230 may calculate effective wavelength data by calibrating the raw wavelength data received from the FBG interrogator 223 using the calibration data, and may measure properties of the thermosetting polymer using the effective wavelength data. Accordingly, a measurement error occurring as the optical fiber of the FBG sensor expands/contracts due to a temperature change may be effectively calibrated, and changes in properties due to solidification of the thermosetting polymer may be accurately measured.

Figure 3:
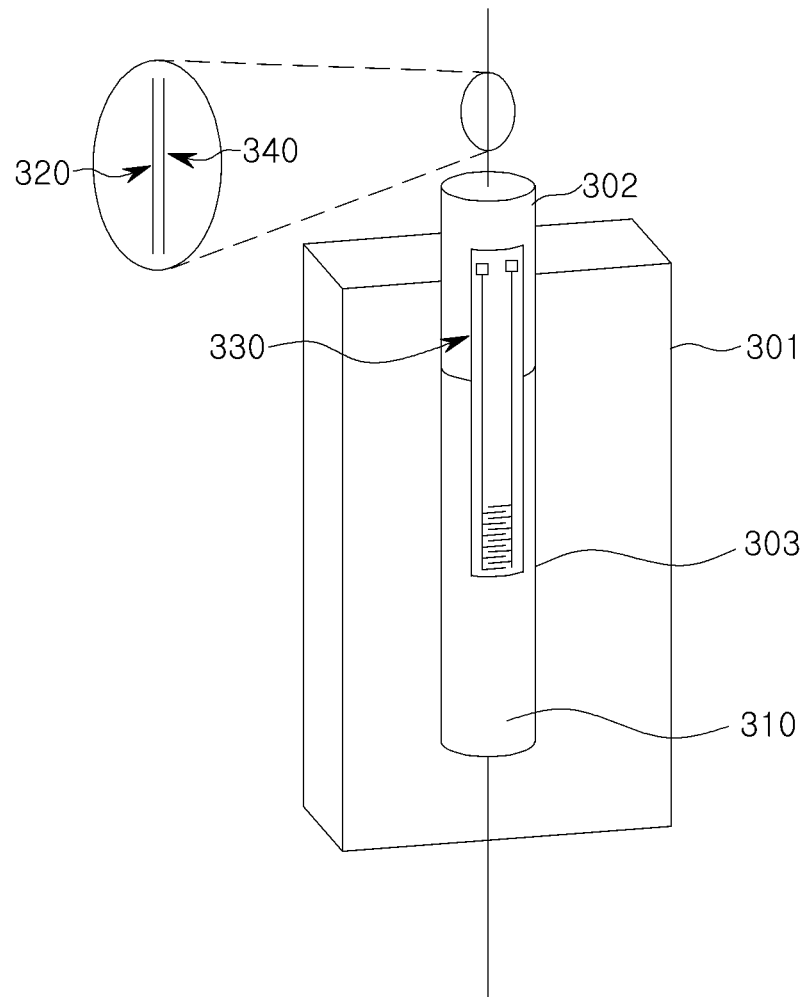
FIGS. 3 and 4 are diagrams illustrating a frame member according to an example embodiment of the present disclosure.
Figure 4:
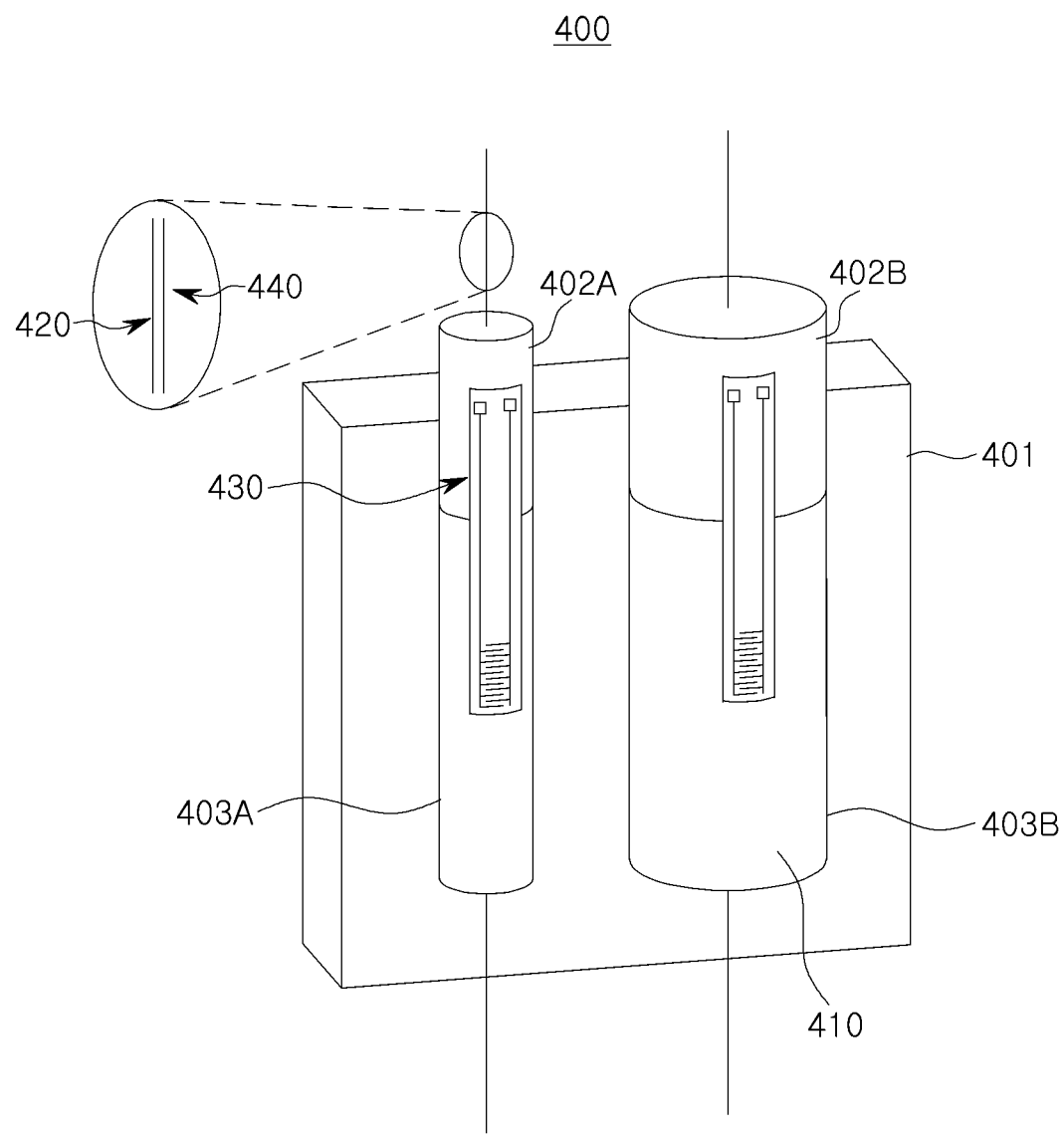

FIGS. 3 and 4 are diagrams illustrating a frame member according to an example embodiment.

Referring to FIG. 3, the frame member 300 may include a frame body 301 and a cap 302, and a chamber 303 configured to receive a thermosetting polymer 310 therewithin may be formed in the frame body 301. For example, the chamber 303 may be formed in the frame body 301 to have a cylindrical shape, and after the chamber 303 is filled with the thermosetting polymer 310, the cap 302 may be combined with the frame body 301 and the thermosetting polymer 310 may be enclosed within the chamber 303.

The frame body 301 and the cap 302 may be penetrated by the FBG sensor 320 including an optical fiber, and accordingly, the FBG sensor 320 may be embedded in the thermosetting polymer 310 and/or otherwise in contact with the thermosetting polymer 310. Also, the dielectric constant sensor 330 including a plurality of electrodes may be in contact with the thermosetting polymer 310 in the chamber in the frame body 301. Meanwhile, as illustrated in an enlarged diagram in FIG. 3, the temperature sensor 340 may be embedded in the thermosetting polymer 310 in combination with the FBG sensor 320 to measure the temperature of the thermosetting polymer 310 while the thermosetting polymer 310 is solidified by heat and pressure applied to the frame body 301. For example, the FBG sensor 320 and the temperature sensor 340 may be embedded in the thermosetting polymer 310 along a central axis of the thermosetting polymer 310 in the cylindrical chamber 303, as illustrated in FIG. 3. The temperature sensor may include dissimilar metal materials, and the metal material may vary depending on temperature conditions for solidifying the thermosetting polymer.

Referring to FIG. 4, a first chamber 403A and a second chamber 403B, each configured to receive a thermosetting polymer 410, may be formed in the frame body 401 of the frame member 400. Each of the first chamber 403A and the second chamber 403B may have a cylindrical shape, and may be combined with the first cap 402A and the second cap 402B after being filled with a thermosetting polymer.

As illustrated in FIG. 4, the first chamber 403A and the second chamber 403B may have the same height and may have different cross-sectional areas. For example, the diameter of the cross-sectional area of the first chamber 403A may be smaller than the diameter of the cross-sectional area of the second chamber 403B. The range and resolution at which the apparatus for measuring properties of a polymer including the frame member 400 may measure properties of the thermosetting polymer 410 may vary depending on a difference between the first chamber 403A and the second chamber 403B, which will be described below.

A plurality of sensors may be connected to each of the first chamber 403A and the second chamber 403B. Referring to FIG. 4, the FBG sensor 420, the dielectric constant sensor 430, and the temperature sensor 440 may be connected to each of the first chamber 403A and the second chamber 403B. For example, the FBG sensor 420, the dielectric constant sensor 430, and the temperature sensor 440 connected to the first chamber 403A may be defined as a first FBG sensor, a first dielectric constant sensor, and a first temperature sensor, respectively. The FBG sensor 420, the dielectric constant sensor 430, and the temperature sensor 440 connected to the second chamber 403B may be defined as a second FBG sensor, a second dielectric constant sensor, and a second temperature sensor, respectively.

The FBG sensor 420, the dielectric constant sensor 430, and the temperature sensor 440 connected to each of the first chamber 403A and the second chamber 403B may individually output data. The computing device may measure an elastic modulus among properties of the thermosetting polymer based on the data received from the FBG sensor 420, the dielectric constant sensor 430, and the temperature sensor 440 connected to the first chamber 403A and the second chamber 403B.

Figure 5:
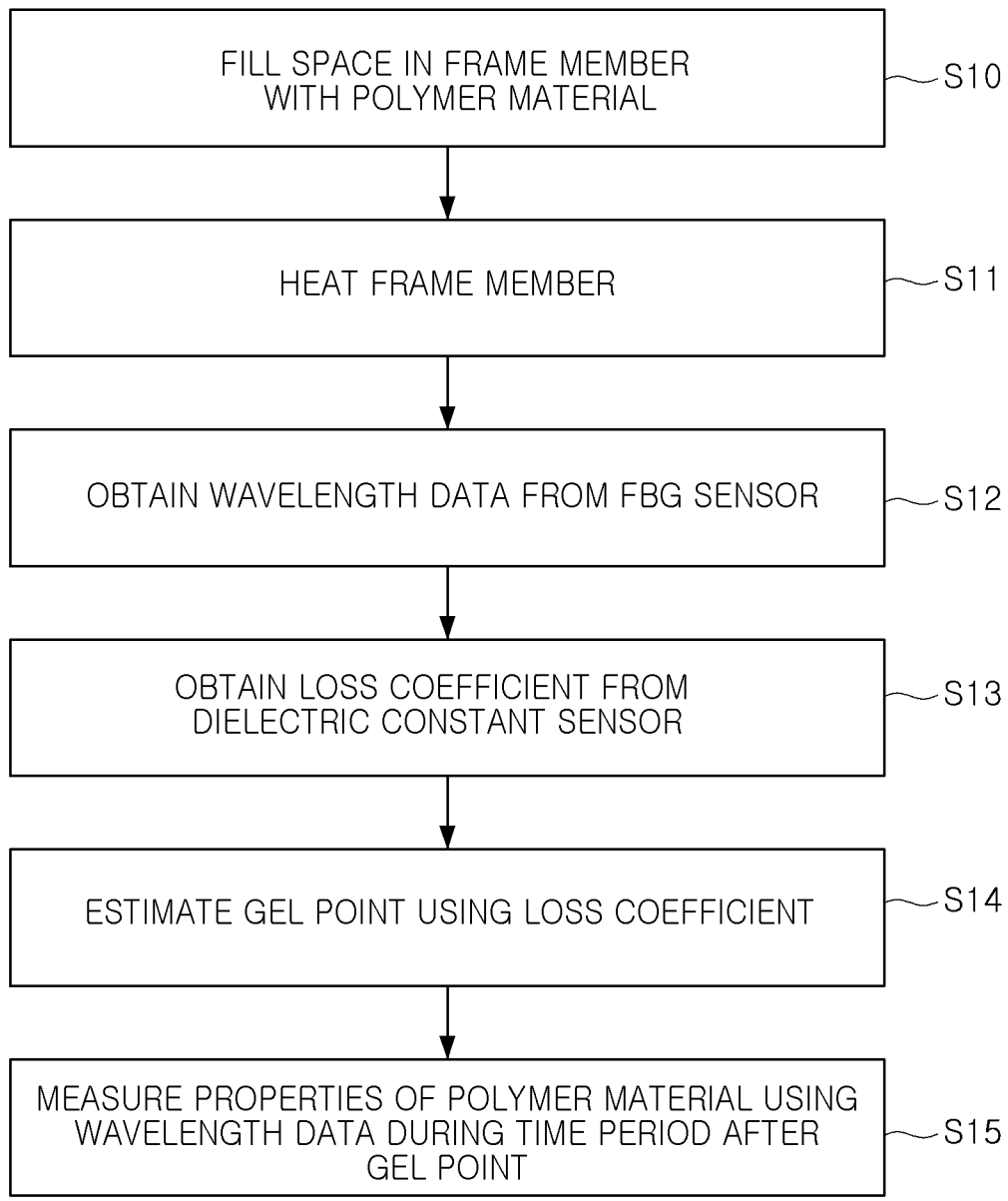
FIGS. 5 and 6 are flowcharts illustrating methods for measuring properties of a thermosetting polymer according to example embodiments of the present disclosure.
Figure 6:
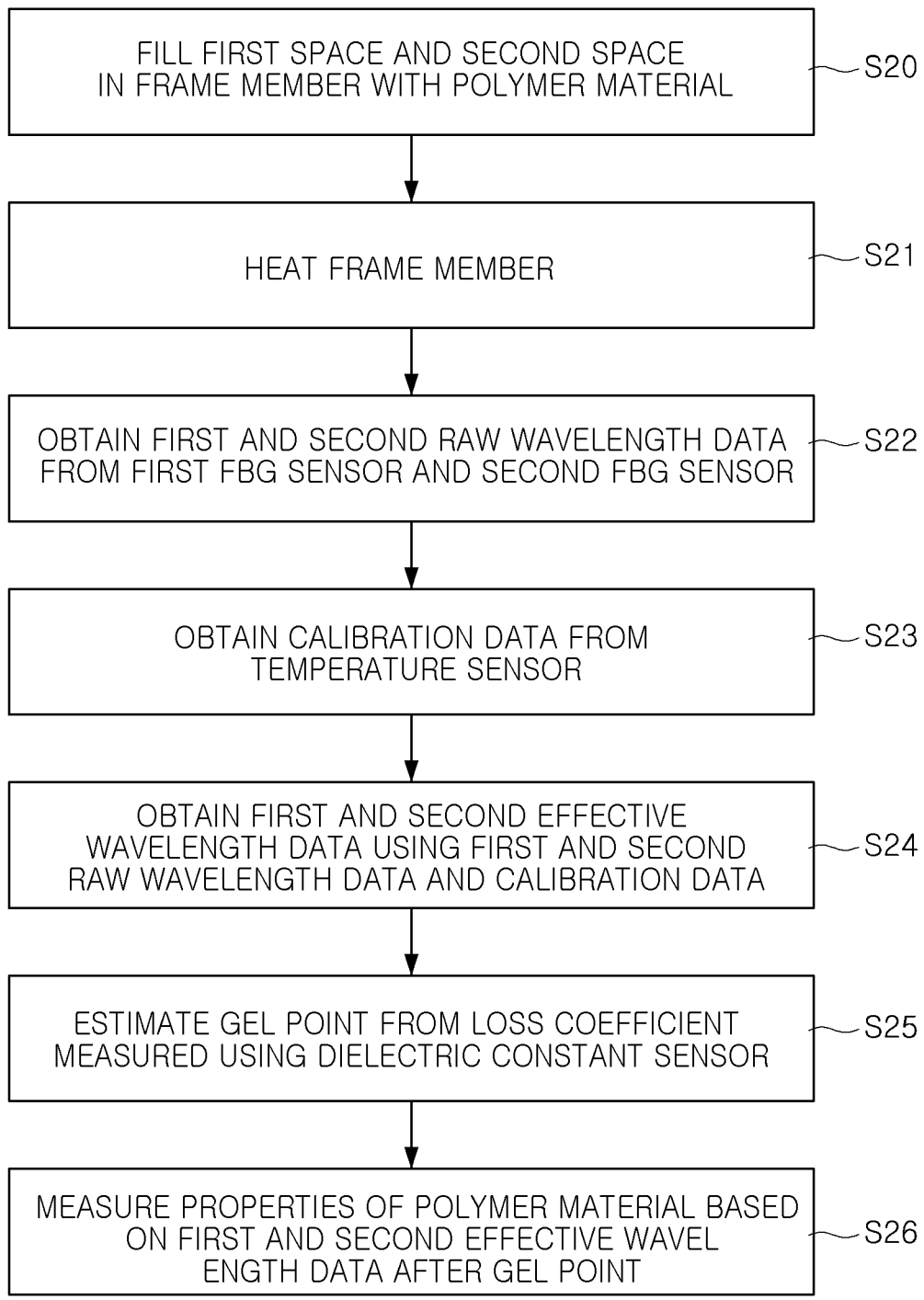

FIGS. 5 and 6 are flowcharts illustrating methods for measuring properties of a thermosetting polymer according to an example embodiment.

Referring to FIG. 5, the method for measuring properties of a polymer according to an example embodiment may start by filling the chamber in the frame member with a thermosetting polymer (S10). As described above, the frame member may include a frame body in which a chamber configured to receive a thermosetting polymer therewithin is formed, and a cap for closing the chamber. The chamber may be formed in a cylindrical shape such that the temperature of the thermosetting polymer filled in the chamber in the frame member may have uniform distribution.

When the thermosetting polymer is filled in the internal chamber of the frame member, the thermosetting polymer may be solidified by heating the frame member (S11). In example embodiments, by applying pressure to a cap coupled to the frame body and closing the chamber filled with the thermosetting polymer, heat and pressure applied to the thermosetting polymer may be controlled together.

When the thermosetting polymer starts solidifying, the computing device may obtain wavelength data from the FBG sensor (S12). For example, while the thermosetting polymer is solidified, light of a predetermined wavelength band may be irradiated to the optical fiber of the FBG sensor, and the computing device may generate wavelength data using the Bragg wavelength of light emitted from the Bragg grating of the FBG sensor.

In an example embodiment, the wavelength band of light irradiated to the optical fiber of the FBG sensor may be about 450 nm to about 2000 nm. A light source may be disposed on an upper end of the cap encapsulating the thermosetting polymer in the chamber in the frame body, such that light may be irradiated to the optical fiber of the FBG sensor.

While the thermosetting polymer is solidified, the computing device may obtain a loss coefficient from the dielectric constant sensor (S13). For example, while the thermosetting polymer is solidified, an alternating voltage may be applied to the plurality of electrodes included in the dielectric constant sensor. Electrodes of the dielectric constant sensor and the thermosetting polymer in contact with the electrodes may be represented as an equivalent circuit including a resistor element and a loss coefficient may be calculated based on a parameter indicating properties of an AC voltage, a resistance value of a resistor element included in an equivalent circuit, and a capacitance value of a capacitor element.

The computing device may estimate a gel point using the loss coefficient obtained in operation S13 (S14). The computing device may estimate the gel point from changes in the loss coefficient over time, and for example, the computing device may determine the point at which changes in the loss coefficient over time is maximum as the gel point. When the gel point is determined, the computing device may measure properties of the thermosetting polymer using the wavelength data for a time period after the gel point (S15).

As described above, the gel point may be a point at which fluidity may decrease and elasticity may be obtained by solidifying the thermosetting polymer from a liquid state. Accordingly, in a thermosetting polymer applied as an encapsulating material for a semiconductor package, the amount of chemical shrinkage and a change in elastic modulus occurring after the gel point may have an influence on whether defects in the semiconductor package may occur. In an example embodiment, by determining the gel point by the loss coefficient obtained using the dielectric constant sensor, changes in properties appearing as the thermosetting polymer hardens after the gel point may be accurately measured.

Referring to FIG. 6, the method for measuring properties of a polymer according to an example embodiment may start by filling the first chamber and the second chamber in the frame member with a thermosetting polymer (S20). As described above with reference to FIG. 4, a first chamber and a second chamber having a cylindrical shape and having different cross-sectional areas may be formed in the frame body. An FBG sensor, a dielectric constant sensor, and a temperature sensor may be connected to each of the first chamber and the second chamber, and the first chamber and the second chamber may be filled with the same thermosetting polymer and may be closed with a first cap and a second cap, respectively.

Thereafter, the frame member may be heated while applying pressure such that the first cap and the second cap are not pushed due to the expansion of the thermosetting polymer (S21). Heat applied to the frame member may solidify the thermosetting polymer.

The FBG sensor, the dielectric constant sensor, and the temperature sensor provided in each of the first and second chambers of the frame member may be connected to a computing device, and the computing device may collect data necessary for measuring properties of the thermosetting polymer through the sensors. For example, while the thermosetting polymer is being solidified, the computing device may obtain first raw wavelength data from a first FBG sensor provided in the first chamber, and may obtain second raw wavelength data from a second FBG sensor provided in the second chamber (S22).

Also, the computing device may obtain calibration data from the temperature sensor in contact with the thermosetting polymer in each of the first chamber and the second chamber (S23). For example, the computing device may obtain the calibration data by referring to the temperature obtained through the temperature sensor and changes according to the temperature of the Bragg wavelength of light emitted from the Bragg grating of the FBG sensor. Accordingly, the calibration data may represent changes in the Bragg wavelength occurring due to a temperature change of the thermosetting polymer while the thermosetting polymer is being solidified.

The computing device may obtain the first effective wavelength data and the second effective wavelength data using the first raw wavelength data, the second raw wavelength data, and the calibration data (S24). In an example embodiment, the computing device may generate first effective wavelength data by subtracting the calibration data from the first raw wavelength data, and may generate the second effective wavelength data by subtracting the calibration data from the second raw wavelength data. Accordingly, each of the first effective wavelength data and the second effective wavelength data may exclude changes in the Bragg wavelength caused by the temperature, and may represent only changes in properties of the thermosetting polymer, such as, for example, changes in the Bragg wavelength due to the amount of chemical shrinkage.

The computing device may estimate the gel point using a loss coefficient measured using a dielectric constant sensor provided in the first chamber and the second chamber, respectively (S25). The computing device may estimate the gel point of the thermosetting polymer in the first chamber using the loss coefficient measured from the first dielectric constant sensor provided in the first chamber, and may also estimate the gel point of the thermosetting polymer in the second chamber. For example, a time point at which changes in the loss coefficient over time is maximum may be estimated as the gel point. When the gel point is determined, the computing device may measure properties of the thermosetting polymer, such as, for example, the amount of chemical shrinkage, the elastic modulus, and the degree of solidification, using the first effective wavelength data and the second effective wavelength data during the time period after the gel point (S26).

Figure 7:
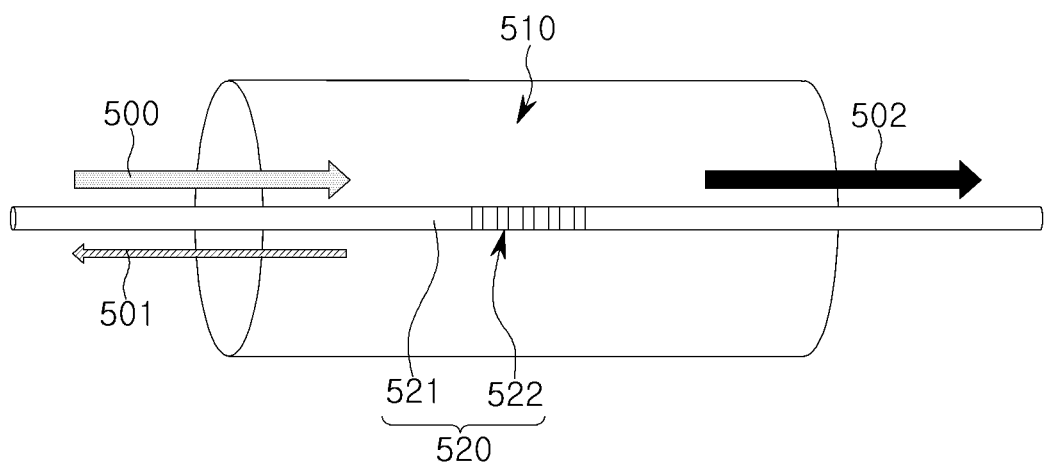
FIG. 7 is a diagram illustrating operations of an FBG sensor included in an apparatus for measuring properties of a thermosetting polymer according to an example embodiment of the present disclosure.

FIG. 7 is a diagram illustrating operations of an FBG sensor included in an apparatus for measuring properties of a polymer according to an example embodiment.

Referring to FIG. 7, the thermosetting polymer 510 may be filled within a cylindrical chamber and then solidified via the application of heat. The FBG sensor 520 may be disposed on a central axis within the thermosetting polymer 510 maintaining a cylindrical shape.

As illustrated in FIG. 7, the FBG sensor 520 may include an optical fiber structure 521 and a grating structure 522 formed therein. The optical fiber structure 521 may include a core in which the grating structure 522 is embedded and a cladding surrounding the core.

When the thermosetting polymer 510 starts solidifying while the FBG sensor 520 is disposed in the thermosetting polymer 510, the computing device may irradiate incident light 500 to the optical fiber structure 521 of the FBG sensor 520. In the grating structure 522 of the FBG sensor 520, reflected light 501 formed as the incident light 500 is reflected, and projected light 502 formed as the incident light 500 passes through the FBG sensor 520. A module connected to the FBG sensor 520, that is, for example, an FBG interrogator, may transmit the Bragg wavelength of the reflected light 501 and/or the projected light 502 to the computing device.

Wavelength data received by the computing device from a module, such as an FBG interrogator, may be raw wavelength data as described above with reference to FIG. 6. In the raw wavelength data, changes in the Bragg wavelength according to the amount of chemical shrinkage due to solidification of the thermosetting polymer 510 and also changes in the Bragg wavelength caused by a temperature change of the thermosetting polymer 510 may be reflected. Accordingly, the computing device may generate calibration data with reference to the temperature measured by the temperature sensor embedded in the thermosetting polymer 510 together with the FBG sensor 520, and may calibrate the raw wavelength data using the calibration data. The effective wavelength data calibrated by the calibration data may represent only the Bragg wavelength change according to the amount of chemical shrinkage due to solidification of the thermosetting polymer 510. Hereinafter, a method of generating effective wavelength data will be described in greater detail with reference to FIGS. 8 to 10.

Figure 8:
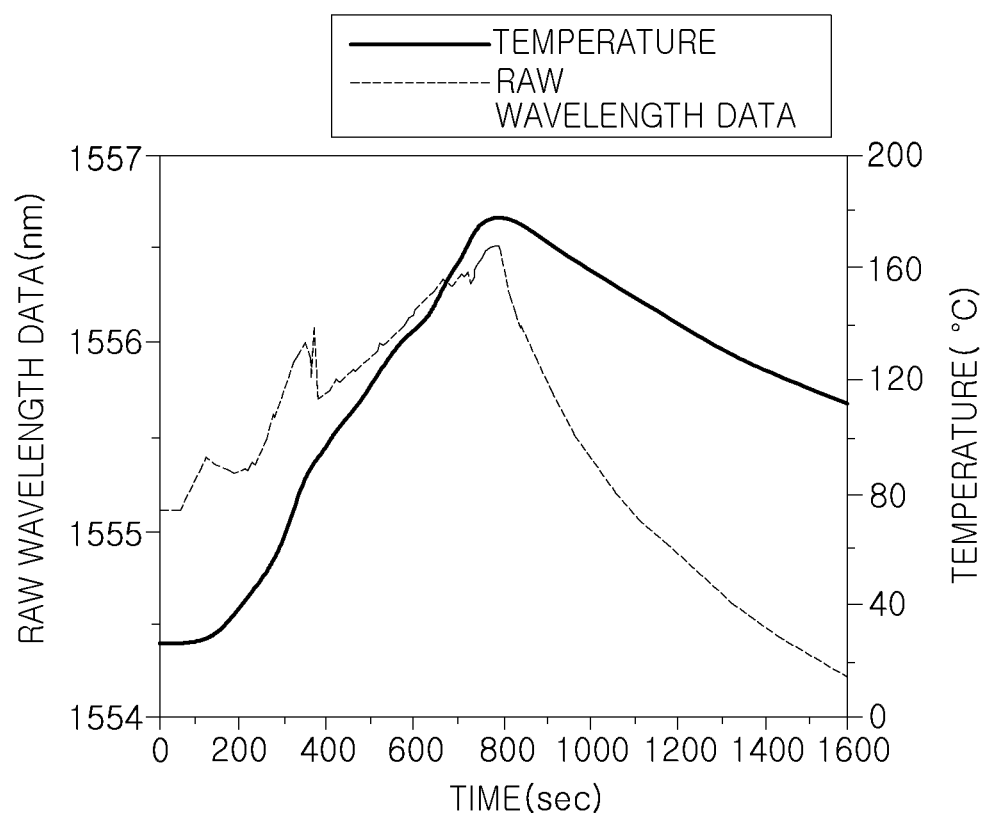
FIGS. 8 to 10 are diagrams illustrating a method for measuring properties of a thermosetting polymer according to an example embodiment of the present disclosure.
Figure 9:
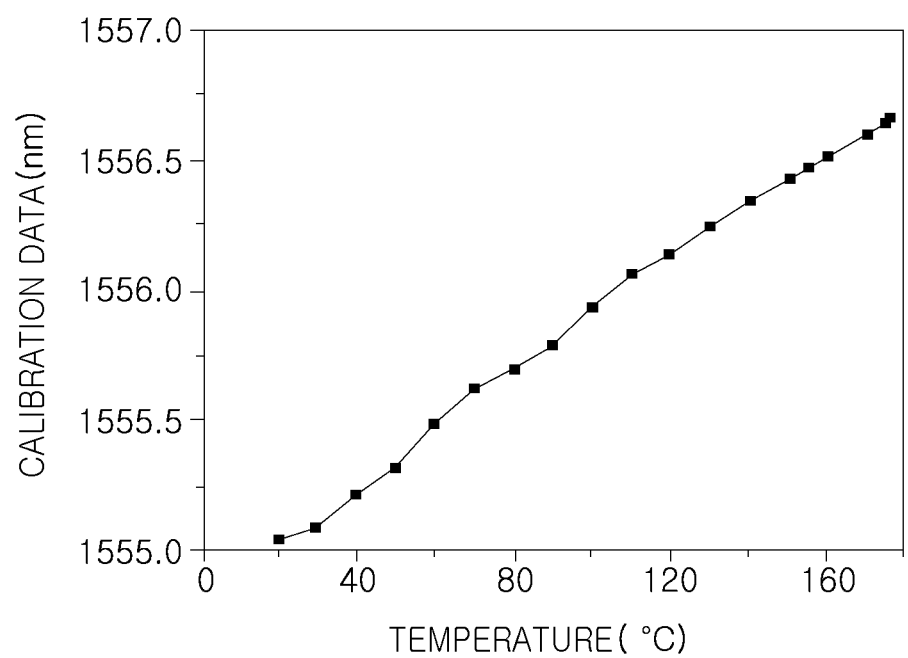
Figure 10:
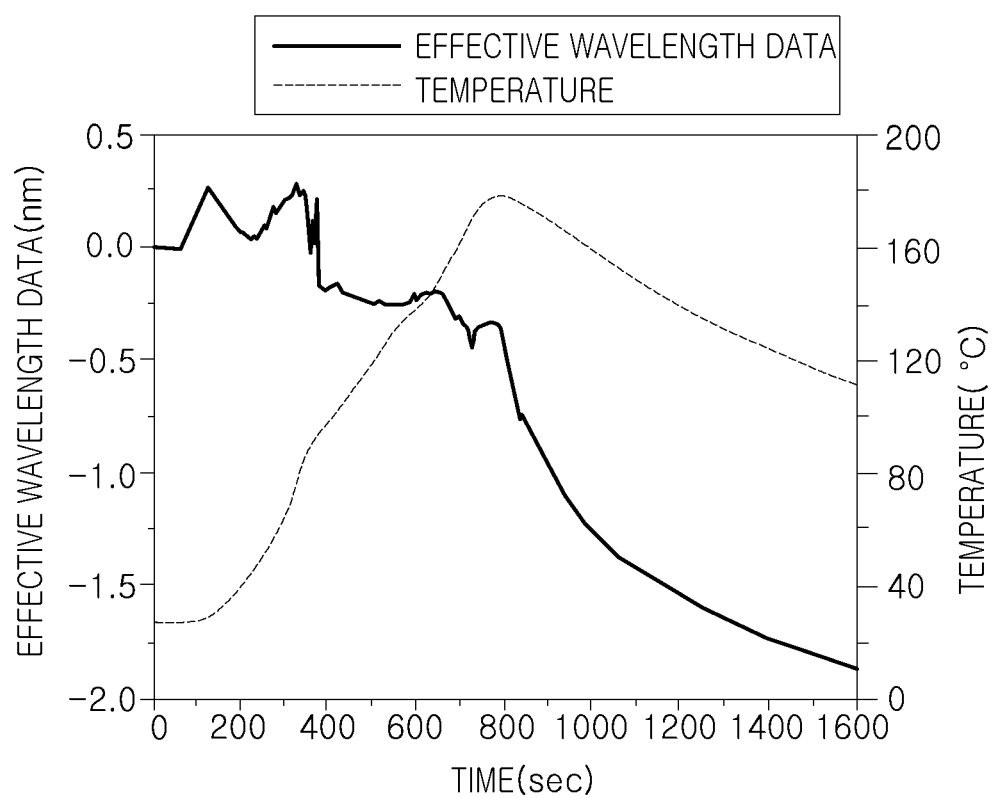

FIGS. 8 to 10 are diagrams illustrating a method for measuring properties of a polymer according to an example embodiment.

FIG. 8 is a graph illustrating the raw wavelength data obtained through the FBG sensor and the temperature data measured through the temperature sensor while the thermosetting polymer is being solidified. In an example embodiment illustrated in FIG. 8, the raw wavelength data may change in a range between about 1554 nm and 1557 nm, and may repeatedly increase and decrease while the polymeric material is being solidified. Meanwhile, referring to the temperature data, the temperature of the thermosetting polymer may increase over time and may decrease after a specific time point, that is, for example, after about 800 seconds has elapsed.

For example, the Bragg wavelength may change by stress and shrinkage occurring during the process of solidifying the thermosetting polymer. However, as described above, the Bragg wavelength may be affected by stress and shrinkage of the thermosetting polymer, and also by the temperature applied to the surroundings for solidifying the thermosetting polymer. Accordingly, changes in the Bragg wavelength represented by the raw wavelength data may include both a wavelength change due to stress and shrinkage of the thermosetting polymer and a wavelength change due to an effect of temperature.

To accurately measure properties of a thermosetting polymer, it may be necessary to remove the wavelength change due to the effect of temperature from the raw wavelength data. To this end, in an example embodiment, calibration data according to temperature may be separately generated, and the calibration data may be reflected in the raw wavelength data, thereby generating effective wavelength data indicating only wavelength changes due to stress and shrinkage of the thermosetting polymer.

FIG. 9 is a graph illustrating calibration data generated in an example embodiment. For example, the calibration data may represent changes in the Bragg wavelength generated in the FBG sensor according to the temperature. As illustrated in FIG. 9, changes in the Bragg wavelength due to the temperature may barely appear at a temperature of 20 degrees or less, and when the temperature increases above 20 degrees, the Bragg wavelength may increase according to the temperature.

In the apparatus for measuring properties of a polymer in example embodiments, effective wavelength data may be generated by subtracting the calibration data illustrated in FIG. 9 from the raw wavelength data illustrated in FIG. 8. Referring to FIGS. 8 and 9 together, the temperature of the thermosetting polymer may be maintained at 20 degrees or less for a period of time before 100 seconds. Changes in the Bragg wavelength due to the increase in temperature may barely appear in the FBG sensor at a temperature of 20 degrees or less, such that the raw wavelength data may be the same as the effective wavelength data. Meanwhile, effective wavelength data may be generated by subtracting the calibration data corresponding to the temperature at the time point from the raw wavelength data when the temperature starts increasing further than 20 degrees.

FIG. 10 is a graph illustrating effective wavelength data generated by the raw wavelength data and the calibration data described with reference to FIGS. 8 and 9. Referring to FIG. 10, the effective wavelength data may correspond to a value obtained by subtracting the calibration data from the raw wavelength data, and accordingly, changes in the Bragg wavelength due to the effect of temperature may be excluded, and changes in the Bragg wavelength according to the stress and shrinkage occurring during the process of solidifying the thermosetting polymer may be mainly represented. In the example embodiment illustrated in FIG. 10, the effective wavelength data may indicate a difference between a wavelength of incident light irradiated through an optical fiber and a wavelength of reflected light and/or projected light.

As described above, the thermosetting polymer may be used as an encapsulating material for a semiconductor package, and in this case, the liquid thermosetting polymer may be solidified such that fluidity may decrease and viscosity may increase, changes in properties of the thermosetting polymer after the gel point at which the thermosetting polymer starts to have elasticity may greatly affect whether the semiconductor package is defective and/or a yield. The apparatus for measuring properties of a polymer according to an example embodiment may increase accuracy of measuring properties of a thermosetting polymer by defining changes in Bragg wavelength after the gel point as a parameter for measuring properties.

For example, the gel point may be estimated using a dielectric constant sensor in contact with the thermosetting polymer. A method of estimating the gel point will be described below. Changes ($\Delta\lambda B$) of the Bragg wavelength according to stress and shrinkage occurring in the process of solidifying the thermosetting polymer may be defined as in Equation 1 below.

[Equation 1]
$$\Delta\lambda_B = \frac{1}{E_f}\left\{\begin{array}{l}\left[1-\frac{n_{eff}^2}{2}(P_{12}-(P_{12}+P_{11})v_f)\right]\sigma_{ss}^f - \\ \left[2v_f + \frac{n_{eff}^2}{2}((1-v_f)P_{11}+(1-3v_f)P_{12})\right]\sigma_{rr}^f\end{array}\right\}^{\lambda_B}$$

In Equation 1, Er may be an elastic modulus of an optical fiber included in the FBG sensor, and $\lambda_B$ may be a wavelength of light irradiated to the optical fiber of the FBG sensor. $P_{ij}$ may be a strain-optic coefficient, $v_f$ may be a Poisson's ratio of the optical fiber, and $n_{eff}^2$ may be an effective refractive index of the FBG sensor. Meanwhile, $\sigma_{zz}^f$ represents stress applied to the FBG sensor in the Z-axis direction (the direction of height of the thermosetting polymer having a cylindrical shape), and $\sigma_{rr}^f$ may represent stress applied to the FBG sensor in the radial direction (the R direction of a circular cross-section of the thermosetting polymer having a cylindrical shape).

For example, the stress $\sigma_{zz}^f$ applied to the FBG sensor in the Z-axis direction and the stress applied to the FBG sensor in the radial direction may be determined as in Equation 2 below. In Equation 2, $C_{1s}$ and $C_{1f}$ may be coefficients determined according to the temperature change of the thermosetting polymer filled in the first chamber provided in the frame member and the FBG sensor in contact the thermosetting polymer. Meanwhile, a may be a radius of the FBG sensor, and b may be a radius of a thermosetting polymer in contact with the FBG sensor.

[Equation 2]
$$\sigma_{rr}^f = \sigma_{\theta\theta}^f = \frac{E_f}{1+v_f}\cdot\frac{C_{1f}}{1-2v_f}$$

$$\sigma_{zz}^f = \frac{2v_f E_f C_{1f}}{(1+v_f)(1-2v_f)} + \frac{\left(\frac{b^2}{a^2}-1\right)\left[\frac{E_s}{1-v_s}>\Delta\varepsilon^{ch}-\frac{2v_s E_s C_{1s}}{(1+v_s)(1-2v_s)}\right]-\frac{2v_f E_f C_{1f}}{(1+v_f)(1-2v_f)}}{1+\frac{E_s}{E_f}\left(\frac{b^2}{a^2}-1\right)}$$

$$C_{1f} =$$

$$\frac{A+B}{C+B}\left(1-\frac{b^2}{a^2}\right)\frac{E_s}{E_f}\frac{(1+v_f)(1-2v_f)}{(1+v_s)(1-2v_s)} + \frac{E_s}{E_f}\left(\frac{b^2}{a^2}-1\right)\frac{(1+v_f)(1-v_f)}{1-v_s}\frac{\Delta\varepsilon^{ch}}{2}$$

$$C_{1s} = \frac{A+B}{C+B}$$

$$A = \left(\frac{b^2}{a^2}-1\right)\frac{\Delta c^{ch}}{2}\left[\frac{1+v_s}{2} - \frac{(v_f-v_s)\frac{E_s}{E_f}}{1+\frac{E_s}{E_f}\left(\frac{b^2}{a^2}-1\right)}\right]$$

$$B = \frac{E_s}{E_f}\left(\frac{b^2}{a^2}-1\right)\frac{\Delta c^{ch}}{2}\frac{(1+v_f)(1-2v_f)}{1-v_s}$$

$$\left\{1 + \frac{2v_f(v_f-v_s)}{(1+v_f)(1-2v_f)\left[1+\frac{E_s}{E_f}\left(\frac{b^2}{a^2}-1\right)\right]}\right\}$$

$$C = 1 + \frac{b^2}{a^2}\frac{1}{1-2v_s} - \frac{E_s}{E_f}\frac{2v_s(v_f-v_s)\left(\frac{b^2}{a^2}-1\right)}{(1+v_s)(1-2v_s)\left[1+\frac{E_s}{E_f}\left(\frac{b^2}{a^2}-1\right)\right]}$$

$$D =$$

$$\frac{E_s}{E_f}\left(\frac{b^2}{a^2}-1\right)\frac{(1+v_f)(1-2v_f)}{(1+v_s)(1-2v_s)}\left\{1+\frac{2v_f(v_f-v_s)}{(1+v_f)(1-2v_f)\left[1+\frac{E_s}{E_f}\left(\frac{b^2}{a^2}-1\right)\right]}\right\}$$

The values changing while the polymeric material is being solidified may be the elastic modulus and the amount of chemical shrinkage of the polymeric material. For example, when the elastic modulus of the thermosetting polymer is expressed as $E_s$ and the amount of chemical shrinkage is expressed as $\Delta\varepsilon^{ch}$, changes in the Bragg wavelength due to the stress and shrinkage occurring in the thermosetting polymer may be simplified as in Equation 3 below. In Equation 3 below, $\beta$ may be a ratio between a radius of the FBG sensor and a radius of the thermosetting polymer embedding the FBG sensor.

$$\Delta\lambda_B = F(E_s,\beta)\cdot\Delta\varepsilon^{ch} \quad \text{[Equation 3]}$$

When the frame body included in the apparatus for measuring properties of a polymer provides a first chamber and a second chamber having different cross-sectional areas, and fills each of the first chamber and the second chamber with the thermosetting polymer and then solidifies the thermosetting polymer, the radius of the first FBG sensor provided in the first chamber and the second FBG sensor provided in the second chamber may be the same. Accordingly, B may be determined according to the radius of the first chamber and the radius of the second chamber. When the thermosetting polymer is being solidified in each of the first chamber and the second chamber having different cross-sectional areas, the computing device of the apparatus for measuring properties of a polymer may derive the changes in the first Bragg wavelength corresponding to the first chamber and the changes in the first Bragg wavelength corresponding to the second chamber as in Equation 3. The computing device may measure the elastic modulus and the amount of chemical shrinkage of the thermosetting polymer by synthesizing an equation representing changes in the first Bragg wavelength and an equation representing changes in the second Bragg wavelength.

The elastic modulus and the amount of chemical shrinkage of the polymeric material may be variables changing over time while the polymeric material is being solidified. The computing device may divide the solidifying time of the thermosetting polymer by a predetermined time interval and may determine a plurality of sections, and may calculate the elastic modulus and the amount of chemical shrinkage of the thermosetting polymer according to the instantaneous Bragg wavelength change value in each section, which will be described in greater detail with reference to FIGS. 11 and 12.

Figure 11:
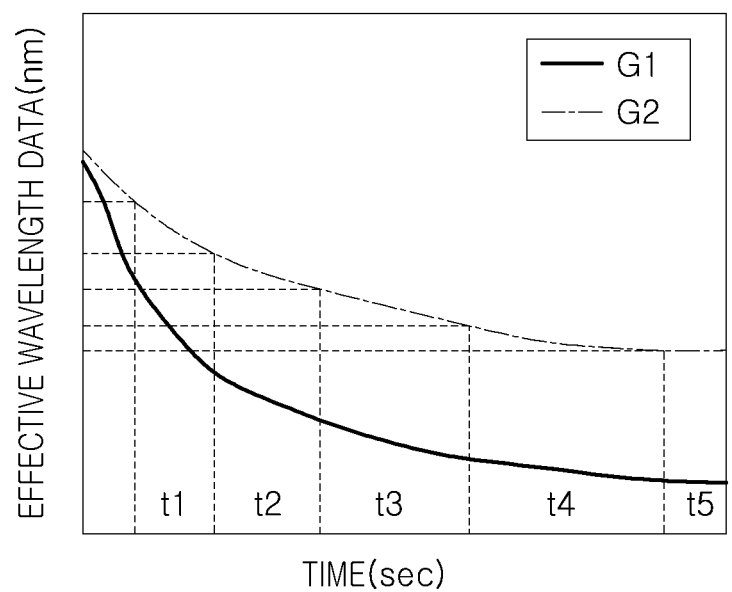
FIGS. 11 and 12 are diagrams illustrating a method for measuring properties of a thermosetting polymer according to an example embodiment of the present disclosure.
Figure 12:
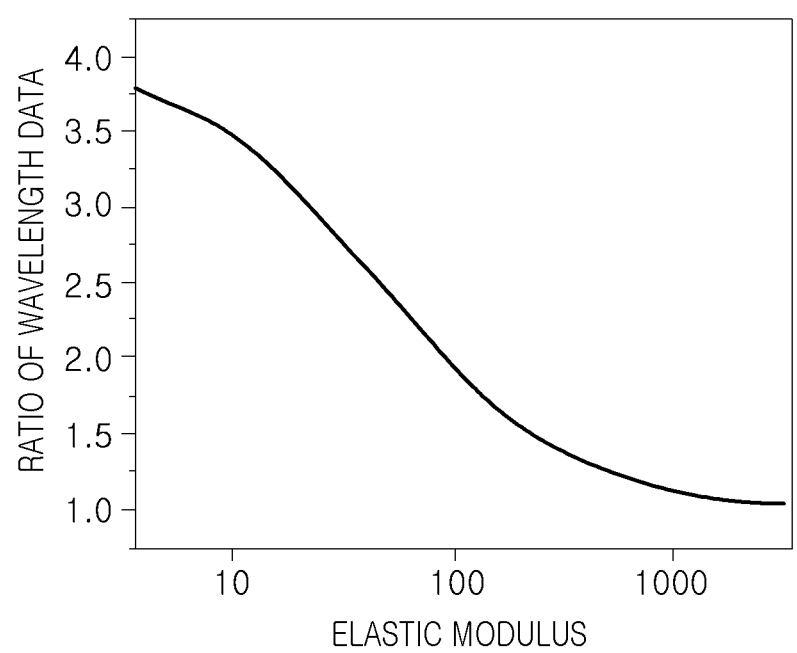

FIGS. 11 and 12 are diagrams illustrating a method for measuring properties of a polymer according to an example embodiment.

FIG. 11 is a graph illustrating changes in Bragg wavelength over time by dividing the time required to solidify the thermosetting polymer in each of the first chamber and the second chamber formed in the frame body into predetermined periods, t1-t5. In FIG. 11, the first graph G1 may represent changes in Bragg wavelength measured from the thermosetting polymer as the thermosetting polymer is being solidified in the first chamber, and the second graph G2 may represent changes in the Bragg wavelength measured from the thermosetting polymer as the thermosetting polymer is being solidified in the second chamber.

The computing device may calculate an instantaneous Bragg wavelength change in each of the plurality of periods, t1-t5, defined as illustrated in FIG. 11, and may determine the elastic modulus and the amount of chemical shrinkage of the thermosetting polymer therefrom. For example, the elastic modulus and the amount of chemical shrinkage of the thermosetting polymer according to the instantaneous Bragg wavelength change in each period may be derived by Equation 4 as below.

[Equation 4]

$$\Delta\lambda_{B,j}^{\beta_1} = F(E_{s,j},\beta_1)\cdot\Delta\varepsilon_j^{ch} \quad (1)$$

$$\Delta\lambda_{B,j}^{\beta_2} = F(E_{s,j},\beta_2)\cdot\Delta\varepsilon_j^{ch} \quad (2)$$

In Equation 4, $\beta_1$ may be a ratio between the radius of the FBG sensor and the radius of the thermosetting polymer in the first chamber, and $\beta_2$ may be the ratio between the radius of the FBG sensor and the radius of the thermosetting polymer in the second chamber. Meanwhile, the subscript j may indicate one of the plurality of periods, t1-t5. In other words, j may have a value of 1 to 5 in the graph illustrated in FIG. 11. By dividing the equations described in Equation 4, the elastic modulus in a specific period among the plurality of periods, t1-t5, may be obtained as in Equation 5 below.

$$\frac{\Delta\lambda_{B,j}^{\beta_1}}{\Delta\lambda_{B,j}^{\beta_2}} = \frac{F(E_{s,j},\beta_1)}{F(E_{s,j},\beta_2)} \quad \text{[Equation 5]}$$

By solving the nonlinear function F in Equation 5 above, the elastic modulus ($E_{s,j}$) of the thermosetting polymer in a specific period may be derived. Also, by substituting the elastic modulus ($E_{s,j}$) of the thermosetting polymer into Equation 3 again, the amount of chemical shrinkage $\Delta\varepsilon_j^{ch}$ of the thermosetting polymer may be calculated. The amount of chemical shrinkage $\Delta\varepsilon_j^{ch}$ of the thermosetting polymer calculated as above may be the sum of the amounts of chemical shrinkage occurring in the previous period. Accordingly, in the j-th section, the amount of chemical shrinkage of the thermosetting polymer and the elastic modulus $E_s(t_j)$ of the thermosetting polymer may be calculated as in Equation 6 below.

$$\varepsilon^{ch}(t_j) = \sum_{i=1}^{j} \Delta \varepsilon_j^{ch} \text{ (for } j = 1, 2, \ldots, m) \quad \text{[Equation 6]}$$

$$E_s(t_j) = E_{s,j}$$

FIG. 12 is a graph illustrating the relationship between the ratio between changes in the first Bragg wavelength measured in the thermosetting polymer in the first chamber and changes in the second Bragg wavelength measured in the thermosetting polymer in the second chamber, and the elastic modulus of the thermosetting polymer. As described above with reference to Equations 2 and 3, the range of the elastic modulus measurable in the thermosetting polymer may be determined according to the radiuses of each of the first chamber and the second chamber formed in the frame member. In an example embodiment, by selecting a frame member providing the first chamber and the second chamber having different radiuses according to the range which the elastic modulus of the thermosetting polymer may have, the elastic modulus of the thermosetting polymer may be accurately measured.

Figure 13:
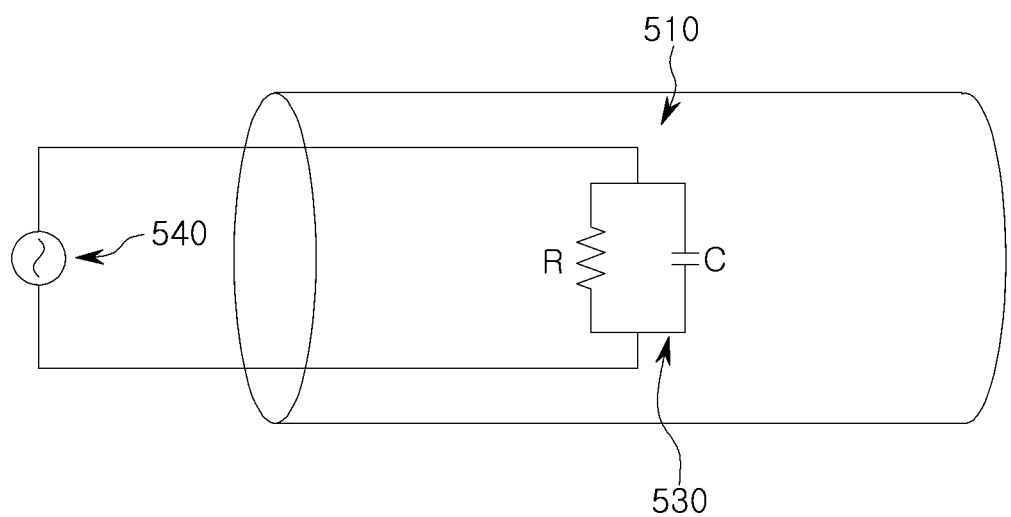
FIG. 13 is a diagram illustrating operations of a dielectric constant sensor included in an apparatus for measuring properties of a thermosetting polymer according to an example embodiment of the present disclosure.

FIG. 13 is a diagram illustrating operations of a dielectric constant sensor included in an apparatus for measuring properties of a polymer according to an example embodiment.

Referring to FIG. 13, the chamber formed in the frame member has a cylindrical shape and is configured to receive the thermosetting polymer 510 therewithin. A dielectric constant sensor may be disposed in the chamber of the frame member so as to be in contact with the thermosetting polymer 510. The dielectric constant sensor may include a plurality of electrodes, and the plurality of electrodes may be connected to a module for applying an AC voltage 540. Also, the plurality of electrodes included in the dielectric constant sensor and the thermosetting polymer in contact with the dielectric constant sensor may be represented by an equivalent circuit 530 including a resistor element R and a capacitor element C, as illustrated in FIG. 13.

The dielectric constant sensor may be used to measure a loss coefficient of the thermosetting polymer 510, and an AC voltage 540 may be applied to the dielectric constant sensor. When the AC voltage 540 is applied to the plurality of electrodes included in the dielectric constant sensor, an electric field may be formed in the thermosetting polymer, the plurality of electrodes may correspond to the resistor element R, and the thermosetting polymer may correspond to the capacitor element C. A loss coefficient representing energy lost due to the movement of dipoles and ions in the thermosetting polymer based on energy supplied by the AC voltage 540 may be represented as in equation 7 below. In equation 7, D may be a loss coefficient, $\omega$ may be an angular frequency of an AC voltage, $R_m$ may be a resistance value of the resistor element R, and $C_m$ may be a capacitance value of the capacitor element C.

$$D = \frac{1}{\omega \cdot R_m \cdot C_m} \quad \text{[Equation 7]}$$

The loss coefficient calculated as in equation 7 may be used to determine the degree of solidification of the thermosetting polymer while the thermosetting polymer is being solidified, and to find the gel point. Hereinafter, a method of finding a gel point based on a loss coefficient measured using the dielectric constant sensor will be described in greater detail with reference to FIGS. 14 and 15.

Figure 14:
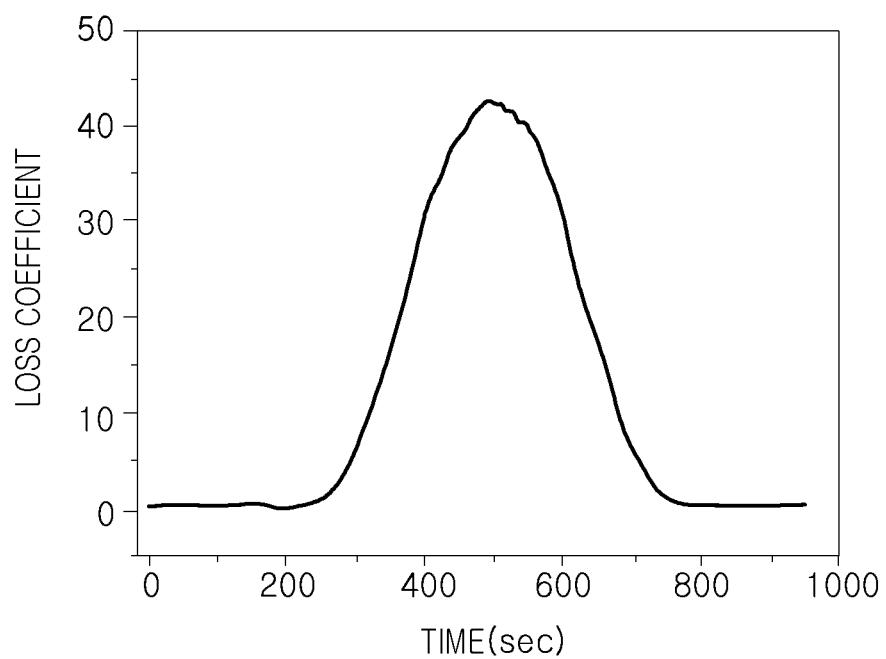
FIGS. 14 and 15 are diagrams illustrating a method for measuring properties of a thermosetting polymer according to an example embodiment of the present disclosure.
Figure 15:
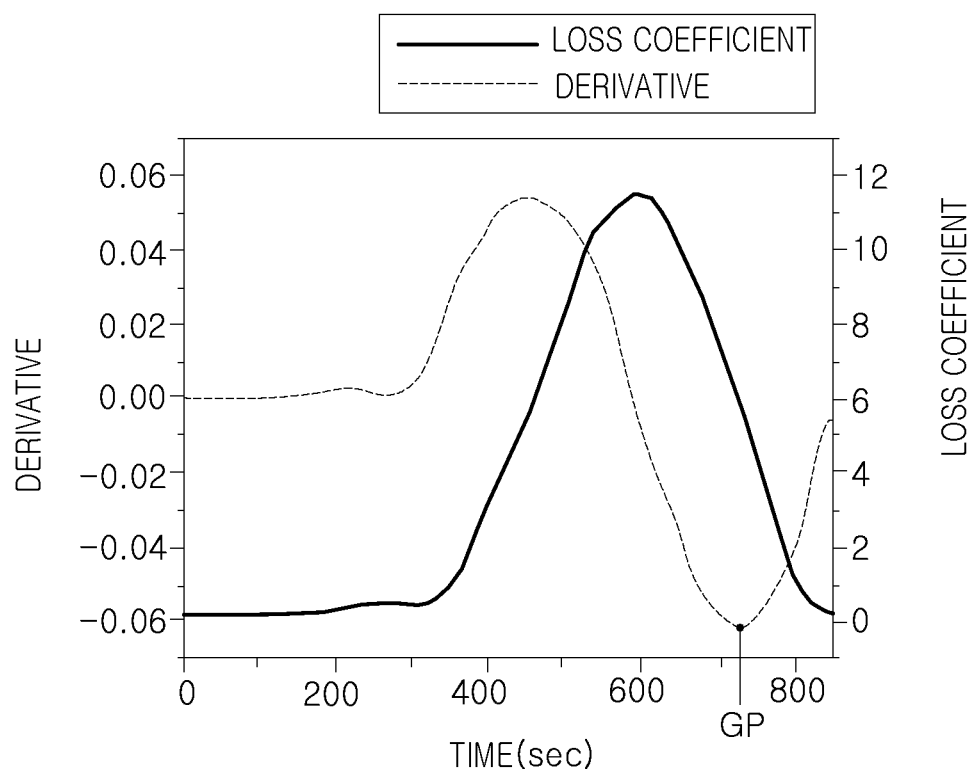

FIGS. 14 and 15 are diagrams illustrating a method for measuring properties of a polymer according to an example embodiment.

FIG. 14 is a graph illustrating a loss coefficient measured using a dielectric constant sensor over time while the thermosetting polymer is being solidified. Referring to FIG. 14, the loss coefficient may be maintained to be constant at an initial value without changing until a specific time point and may increase, and may increase again to a specific value and may decrease. For example, while the thermosetting polymer is in a liquid state, the loss coefficient may increase as the movement of dipoles and ions becomes active, and the loss coefficient may start decreasing due to solidification of the thermosetting polymer.

After the loss coefficient starts decreasing in the thermosetting polymer, the moment at which the value of the loss coefficient converges may be determined as the time point at which the thermosetting polymer has sufficiently solidified, and the degree of solidification of the thermosetting polymer may be determined using the decrease in the loss coefficient. Also, while the loss coefficient of the thermosetting polymer decreases, the time point at which the decrease rate of the loss coefficient over time is maximum may correspond to the gel point. Accordingly, in an example embodiment, by differentiating changes in the loss coefficient over time as illustrated in FIG. 15, the gel point may be found.

FIG. 15 is a graph illustrating changes in a loss coefficient over time and changes in a differential value of the loss coefficient over time. Referring to FIG. 15, when about 600 seconds elapses after the dielectric constant sensor starts measuring the loss coefficient while heat is applied to the frame member enclosing the thermosetting polymer, the loss coefficient may decrease due to solidifying the thermosetting polymer. In the proximity of 600 seconds, the differential value may be 0, and as the loss coefficient decreases, the differential value may have a negative sign.

In the example embodiment illustrated in FIG. 15, a time point at which the shrinkage rate of the loss coefficient is maximum may appear after 700 seconds. The computing device connected to the dielectric constant sensor in the apparatus for measuring properties of a polymer may determine a time point at which a shrinkage rate of the loss coefficient is maximum as a gel point GP. As described above, the gel point GP may be a time point at which the liquid thermosetting polymer is being solidified such that fluidity may decrease and viscosity may increase, and the thermosetting polymer may have elasticity after the gel point GP. Accordingly, the strain of the thermosetting polymer appearing after the gel point GP may have a great influence on the properties of a product to which the thermosetting polymer is applied and whether defects occur.

In an example embodiment, as described with reference to FIGS. 14 and 15, the gel point may be found using a loss coefficient measured through the dielectric constant sensor while the thermosetting polymer is being solidified. Accordingly, the amount of chemical shrinkage, the degree of solidification, and elastic modulus, appearing in the thermosetting polymer after the gel point, may be accurately determined. Also, by measuring the strain of the thermosetting polymer appearing after the gel point, the effect of solidifying the thermosetting polymer in various fields to which the thermosetting polymer is applied may be accurately predicted.

Figure 16:
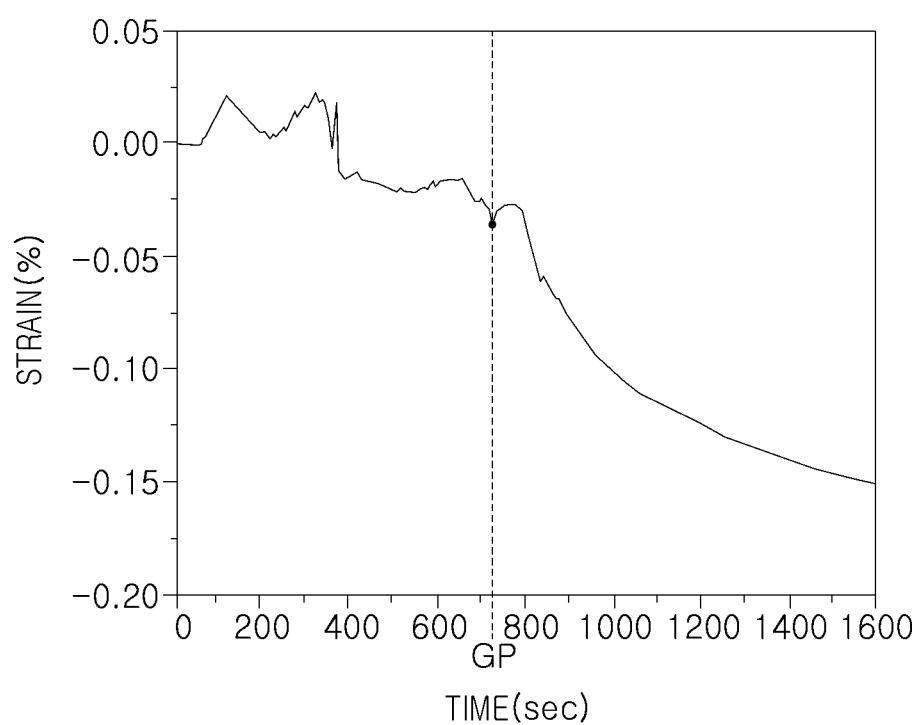
FIG. 16 is a diagram illustrating a method for measuring properties of a thermosetting polymer according to an example embodiment of the present disclosure.

FIG. 16 is a diagram illustrating a method for measuring properties of a polymer according to an example embodiment.

FIG. 16 is a graph illustrating strain of the thermosetting polymer over time while the thermosetting polymer is being solidified. The strain of the thermosetting polymer illustrated in FIG. 16 may appear according to the amount of chemical shrinkage and changes in the elastic modulus, which may occur while the thermosetting polymer is being solidified. As illustrated in FIG. 16, in an example embodiment, the strain occurring in the thermosetting polymer during the time period after the gel point GP measured based on the loss coefficient may be tracked.

As described with reference to FIGS. 1 to 16, in an example embodiment, using an FBG sensor and a temperature sensor, the effect of an increase in temperature while the thermosetting polymer is being solidified may be excluded, wavelength data according to changes in properties of the thermosetting polymer may be collected, and the elastic modulus and chemical shrinkage of the thermosetting polymer may be monitored based on the data. Also, the loss coefficient of the thermosetting polymer may be measured from the dielectric constant sensor in contact with the thermosetting polymer, and the gel point may be estimated based on the shrinkage rate of the loss coefficient. The strain of the thermosetting polymer appearing after the gel point at which the thermosetting polymer starts to have elasticity may have a great effect on products to which the thermosetting polymer is applied, such as, for example, a semiconductor package. In an example embodiment, the strain due to the elastic modulus and the amount of chemical shrinkage of the thermosetting polymer after the gel point may be determined, and accordingly, properties which may greatly affect a product to which the thermosetting polymer is applied may be accurately determined.

According to the aforementioned example embodiments, while the thermosetting polymer is being solidified, wavelength data and a loss coefficient may be collected by the FBG sensor and the dielectric constant sensor in contact with the thermosetting polymer, and properties of the thermosetting polymer may be measured based on the wavelength data and the loss coefficient. The thermosetting polymer may be solidified after being placed within the chamber in the frame member, and by estimating the gel point and measuring changes in properties of the thermosetting polymer appearing during the time period after the gel point, the changes in properties which may have a significant effect on the surrounding structure while the thermosetting polymer is being solidified may be accurately measured.

While the example embodiments have been illustrated and described above, it will be configured as apparent to those skilled in the art that modifications and variations could be made without departing from the scope of the present disclosure as defined by the appended claims.

What is claimed is:

1. An apparatus configured for measuring properties of a thermosetting polymer, the apparatus comprising:
a body comprising a first chamber and a second chamber, wherein the first chamber and the second chamber are each configured to receive the thermosetting polymer therewithin;
a first fiber Bragg grating (FBG) sensor within the first chamber;
a second FBG sensor within the second chamber;
a first dielectric constant sensor within the first chamber;
a second dielectric constant sensor within the second chamber; and
at least one processor in communication with the first FBG sensor, the second FBG sensor, the first dielectric constant sensor, and the second dielectric constant sensor, wherein the at least one processor is configured to measure properties of the thermosetting polymer within the first and second chambers, as the thermosetting polymer solidifies, using wavelength data received from the first FBG sensor, the second FBG sensor, and a loss coefficient received from the first dielectric constant sensor and the second dielectric constant sensor.

2. The apparatus of claim 1, wherein the first chamber and the second chamber each have a cylindrical shape.

3. The apparatus of claim 2, wherein a height of the first chamber is equal to a height of the second chamber, and a diameter of the first chamber is smaller than a diameter of the second chamber.

4. The apparatus of claim 3, wherein a range of properties measured by the at least one processor is determined based on a ratio between a diameter of the first chamber and a diameter of the second chamber.

5. The apparatus of claim 1, wherein the at least one processor is configured to determine a reference time point at which the thermosetting polymer changes to a gel state, and to measure properties of the thermosetting polymer based on wavelength data from the first FBG sensor and second FBG sensor for a time period after the reference time point.

6. The apparatus of claim 1, wherein the at least one processor is configured to measure at least one of an elastic modulus, an amount of chemical shrinkage, and a degree of solidification of the thermosetting polymer.

7. The apparatus of claim 1, further comprising:
a temperature sensor configured to measure a temperature of the thermosetting polymer as the thermosetting polymer solidifies,
wherein the at least one processor is configured to receive temperature data from the temperature sensor and is configured to generate calibration data representing changes in wavelength as the thermosetting polymer solidifies.

8. The apparatus of claim 7,
wherein the at least one processor is configured to receive first raw wavelength data from the first FBG sensor and second raw wavelength data from the second FBG sensor,
wherein the at least one processor is configured to process the first raw wavelength data and the calibration data to obtain first effective wavelength data for the thermosetting polymer in the first chamber, and
wherein the at least one processor is configured to process the second raw wavelength data and the calibration data to obtain second effective wavelength data for the thermosetting polymer in the second chamber.

9. The apparatus of claim 8, wherein the at least one processor is configured to subtract the calibration data from the first raw wavelength data to obtain the first effective wavelength data, and to subtract the calibration data from the second raw wavelength data to obtain the second effective wavelength data.

10. The apparatus of claim 8, wherein the first effective wavelength data comprises a difference in wavelengths between light incident to the first FBG sensor and light reflected from the first FBG sensor, and the second effective wavelength data comprises a difference in wavelengths between light incident to the second FBG sensor and light reflected from the second FBG sensor.

11. The apparatus of claim 1, further comprising:
an FBG interrogator in communication with the first FBG sensor, the second FBG sensor, and the at least one processor.

12. An apparatus configured for measuring properties of a thermosetting polymer, the apparatus comprising:
a body comprising a chamber configured to receive the thermosetting polymer;
a sensor unit within the chamber and comprising a fiber Bragg grating (FBG) sensor, a temperature sensor, and a dielectric constant sensor; and
at least one processor in communication with the FBG sensor, the temperature sensor, and the dielectric constant sensor, wherein the at least one processor is configured to generate wavelength data representing changes in a wavelength of light, caused by solidification of the thermosetting polymer, using raw wavelength data from the FBG sensor and calibration data from the temperature sensor, and wherein the at least one processor is configured to measure properties of the thermosetting polymer using the generated wavelength data during a time period after an estimated gel point for the thermosetting polymer.

13. The apparatus of claim 12, wherein the chamber has a cylindrical shape.

14. The apparatus of claim 12, wherein the body comprises a plurality of chambers, and the at least one processor measures properties of the thermosetting polymer using the generated wavelength data and the estimated gel point from each of the plurality of chambers.

15. The apparatus of claim 12, wherein the at least one processor is configured to determine a slope of a loss coefficient by differentiating the loss coefficient over time, and to determine a time point at which the slope of the loss coefficient is the lowest.

16. The apparatus of claim 12, wherein the thermosetting polymer is an epoxy molding compound.

17. The apparatus of claim 12, wherein the sensor unit further comprises a data acquisition module (DAQ) in communication with the temperature sensor and the at least one processor, an FBG interrogator in communication with the FBG sensor and the at least one processor, and an inductance, capacitance, and resistance (LCR) meter in communication with the dielectric constant sensor and the at least one processor.

18. A method for measuring properties of a thermosetting polymer, the method comprising:
applying heat to the thermosetting polymer to cause the thermosetting polymer to solidify;
obtaining raw wavelength data from a fiber Bragg grating (FBG) sensor in contact with the thermosetting polymer;
obtaining calibration data from a temperature sensor in contact with the thermosetting polymer;
processing the raw wavelength data and the calibration data via at least one processor to determine effective wavelength data;
measuring a loss coefficient of the thermosetting polymer using a dielectric constant sensor in contact with the thermosetting polymer; and
processing the effective wavelength data and the loss coefficient to determine properties of the thermosetting polymer via the at least one processor.

19. The method of claim 18,
wherein the thermosetting polymer is enclosed within first and second chambers, wherein the first and second chambers have different volumes, and
wherein an amount of chemical shrinkage and an elastic modulus of the thermosetting polymer are measured using a difference between first effective wavelength data from the thermosetting polymer in the first chamber and second effective wavelength data from the thermosetting polymer in the second chamber.

20. The method of claim 18, wherein, as the thermosetting polymer solidifies, a time point at which an amount of decrease in the loss coefficient over time is maximum is determined by the at least one processor as a gel point.

* * * * *